(12) United States Patent
Matsuo et al.

(10) Patent No.: US 8,327,802 B2
(45) Date of Patent: Dec. 11, 2012

(54) ANIMAL LITTER BOX

(75) Inventors: Takayuki Matsuo, Tokyo (JP); Takeshi Ikegami, Tokyo (JP); Kenji Hiroshima, Tokyo (JP); Nobuaki Namikawa, Toyama (JP)

(73) Assignee: Uni-Charm Corporation, Ehime (JP)

( * ) Notice: Subject to any disclaimer, the term of this patent is extended or adjusted under 35 U.S.C. 154(b) by 61 days.

(21) Appl. No.: 12/146,111

(22) Filed: Jun. 25, 2008

(65) Prior Publication Data

US 2009/0000558 A1 Jan. 1, 2009

(30) Foreign Application Priority Data

Jun. 29, 2007 (JP) .................................. 2007-173557

(51) Int. Cl.
*A01K 29/00* (2006.01)
(52) U.S. Cl. ........................................................ 119/166
(58) Field of Classification Search .................. 119/166, 119/167, 161, 165; 220/628, 630; *A01K 29/00, A01K 1/03*
See application file for complete search history.

(56) References Cited

U.S. PATENT DOCUMENTS

| | | | | |
|---|---|---|---|---|
| 4,732,111 A * | 3/1988 | Runion | | 119/165 |
| 5,058,528 A * | 10/1991 | Counseller et al. | | 119/165 |
| 5,289,800 A * | 3/1994 | Walton | | 119/166 |
| 5,353,743 A * | 10/1994 | Walton | | 119/166 |
| 5,392,733 A * | 2/1995 | Tominaga | | 119/165 |
| 5,598,810 A * | 2/1997 | Lawton, III | | 119/166 |
| 5,699,754 A * | 12/1997 | Cahajla | | 119/166 |
| 6,129,050 A * | 10/2000 | Carbajal | | 119/165 |
| 6,135,057 A * | 10/2000 | Cummings | | 119/165 |
| 6,474,262 B1 * | 11/2002 | Ceccon | | 119/166 |
| 6,796,430 B2 * | 9/2004 | Mercier et al. | | 206/505 |
| 6,994,054 B2 | 2/2006 | Matsuo et al. | | |
| 7,131,396 B2 * | 11/2006 | Matsuo et al. | | 119/166 |
| 7,584,717 B2 * | 9/2009 | Skovron et al. | | 119/165 |
| 2006/0124068 A1 * | 6/2006 | Matsuo et al. | | 119/166 |
| 2007/0068461 A1 * | 3/2007 | Hill | | 119/166 |

FOREIGN PATENT DOCUMENTS

| | | |
|---|---|---|
| CN | 1640246 A | 7/2005 |
| JP | 3-10755 U | 1/1991 |
| JP | 04-48958 U | 4/1992 |
| JP | 2005006605 | 1/2005 |
| JP | 1240264 | 5/2005 |
| JP | 2006101890 | 4/2006 |
| JP | 2007000124 | 1/2007 |
| JP | 2007159591 | 6/2007 |

OTHER PUBLICATIONS

First Office Action from corresponding CN Application No. 20088002947.3, mailed Jul. 20, 2011, 13 pgs.

* cited by examiner

*Primary Examiner* — Richard Price, Jr.
(74) *Attorney, Agent, or Firm* — Brinks Hofer Gilson & Lione

(57) ABSTRACT

An animal litter box includes: an upper container, which having an upper opening for animals to come in and out, and a bottom portion, which allows fluid to pass through and over which particulate matter is spread; and a lower container having a lower opening provided below the bottom portion, and a holding portion for disposing a fluid absorbing sheet container in which the fluid absorbing sheet which absorbs fluid passing through the bottom portion is laid, wherein a fitting portion for fitting to an edge of a lower opening of the lower container is provided at a side or bottom of the upper container. The fitting portion is preferably a stepped portion or a concave portion.

6 Claims, 6 Drawing Sheets

ANIMAL LITTER BOX

This application is based on and claims the benefit of priority from Japanese Patent Application No. 2007-173557, filed on 29 Jun. 2007, the content of which is incorporated herein by reference.

BACKGROUND OF THE INVENTION

1. Field of the Invention

The present invention relates to an animal litter box used by animals such as cats and the like kept indoors, for example.

2. Related Art

Animals such as cats and the like enter an animal litter box and excrete urine and feces on the cat litter or the like. A pet owner removes the cat litter soiled by such urine and feces together with the feces and the like from the container, and then replenishes new cat litter according to the amount removed. However, cats and the like have a habit of stirring the cat litter with their legs after excretion, increasing the amount of cat litter soiled with urine and feces. In addition, since soiled cat litter spreads, it is difficult to completely remove only the soiled cat litter. Moreover, particles used in the cat litter or the like absorb urine to a certain degree, however, they cannot completely absorb the urine. Accordingly, the pet owner goes to a lot of trouble in keeping the litter box clean.

Accordingly, an integrally-molded particle container with an opening for animals to come in and out, a bottom portion which allows fluid to pass through and over which particulate matters are spread, and a holding portion from which a fluid absorbing sheet container may be drawn is held at a position under the bottom portion, has been disclosed in Japanese Unexamined Patent Application Publication No. 2005-6605 (Patent Document 1). The animal litter box provides the fluid absorbing sheet so as to avoid making contact with the bottom portion, thereby preventing fluid such as urine or the like absorbed into the fluid absorbing sheet from turning back. Accordingly, the animal litter box is fuss free and is easily cleaned.

However, since the aforementioned particle container has a complex structure because the bottom portion and the holding portion are integrally molded, it is difficult to clean the underside (holding portion side) of the bottom portion, for example.

In addition, an animal litter box, which is configured with an inner container including an opening for animals to come in and out and a bottom portion allowing fluid to pass through, and an outer container similarly including an opening and provided so as to overlap with the outside of the inner container, wherein both containers are joined at the respective openings, and a fluid absorbing sheet container is provided between the bottom portion of the inner container and the bottom portion of the outer container, has been disclosed in Japanese Design Registration Publication No. 1240264 (Patent Document 2).

However, with the animal litter box disclosed in Patent Document 2, both containers are in a stacked state since an edge of the opening of the inner container is joined to an edge of the opening of the outer container. Therefore, a side of the inner container and a side of the outer container overlap and become double, generating a waste of molding materials and increasing costs.

In addition, since both containers are joined at the respective edges of the openings, the depth of the outer container matches the depth of the entire container. Since an animal litter box is typically large and occupies a large space for non-manufacturing distribution and sales, an animal litter box which occupies as little space as possible in packaging is needed. Considering this point, the animal litter box of Patent Document 2 including a large outer container is not sufficiently compact for distribution and sales. In addition, the necessity of a large metal mold for molding increases costs, decreases productivity, and easily generates process defects.

Furthermore, with the animal litter box disclosed in Patent Document 2, the inner container is supported by the edge of the opening of the outer container and suspended. If an animal such as a cat and the like gets on the bottom portion in this state, deformation of the bottom portion of the inner container increases since the distance between the bottom portion of the inner container as the point to which force is applied and the edge of the opening as a fulcrum which supports the force is long. Improvement is required because animals such as cats and the like typically dislike the deformation of the bottom portion, however, with the animal litter box according to Patent Document 2, there is no sufficient countermeasure for this deflection, making animals uncomfortable.

The present invention is provided in view of the aforementioned problems, and aims to provide an animal litter box which allows suppression of costs for raw materials for molding, is compact and easy to store and carry when packaging, and comfortable for animals.

SUMMARY OF THE INVENTION

As a result of dedicated research for solving the aforementioned problems, the inventors have found that it is possible to solve the aforementioned problems by providing a joint for joining to an edge of an opening of a lower container at a side or a bottom of an upper container and providing the upper container on the lower container so as to overlap, leading to completion of the present invention. More specifically, the present invention provides the following animal litter box.

A first aspect of the present invention is an animal litter box, including: an upper container, having an upper opening for animals to come in and out, and a bottom portion which allows fluid to pass through and over which particulate matter is spread; and a lower container having an opening at the top side provided below the bottom portion, and a holding portion for disposing a fluid absorbing sheet which absorbs fluid passing through the bottom portion, wherein a fitting portion for fitting to an edge of a lower opening of the lower container is provided at a side or bottom of the upper container.

According to the first aspect of the present invention, provision of the fitting portion for fitting to the edge of the opening of the lower container at a 'side or bottom' of the upper container prevents the sides of the animal litter box from widely overlapping with the sides of the upper container and the sides of the lower container. In other words, the present invention is characterized in that the upper container and the lower container are stacked in two levels above and below, and not doubly providing an inside container and an outer container. This reduces the molding resin used for doubled portions of the sides, preventing generation of waste of molding material, and reducing costs.

In addition, fitting is performed at a side or bottom of the upper container, and the depth of the entire container is shared by the upper container and the lower container. This reduces the size of each container, decreasing the size of a metal mold for molding, increasing productivity, and preventing generation of process defects.

Moreover, it is preferable that the upper container includes a concave portion in its overall shape, which may hold the lower container therein. In this case, the lower container may be held within the concave portion of the upper container by separating the upper container and the lower container during distribution. This allows for a decrease in the space required for packaging, and has the excellent effect of allowing the packaged state for distribution and sales to be compact. A ratio of the depth (height) of the upper container and the depth (height) of the lower container is not particularly limited, however, it is preferably from 3:1 to 1:2.

Furthermore, since the upper container and the lower container are fitted (joined) at a 'side or bottom' of the upper container, the distance between the bottom portion of the upper container as a point to which force is applied and the 'side or bottom' as a fulcrum which supports the force is short. This decreases deformation at the bottom portion of the upper container, preventing animals such as cats and the like from being uncomfortable.

In the present invention, "a bottom portion which allows fluid to pass through" means that fluid such as urine and the like excreted on the particulate matter may easily pass through the underside (side facing the fluid absorbing sheet) from the top side (side making contact with the particulate matters) of the bottom portion of the upper container, and includes multiple openings formed in the shape of a mesh, grating, or the like. It is preferable that the openings are smaller than the particulate matters to prevent the particulate matters that are spread over the bottom portion from passing through. In addition, fluid such as urine and the like pass through smoothly, and it should have sufficient strength to prevent breakage even if it supports animals such as cats and the like. Therefore, the ratio (opening ratio) that the total of the entire opening surface area of the multiple openings of the opening portion, occupies with respect to the area of the opening region at the bottom portion (meaning the surface area of the actual openings, excluding peripheral areas) is from 25% to 75%, preferably from 35% to 65%, more preferably from 45% to 55%. The materials of the particulate matter and the absorbing sheet are not particularly limited. Conventionally well-known materials may be used.

With the present invention, "animals" include baby tigers, lions, and the like, in addition to so-called pets such as dogs, cats, rabbits, hamsters, and the like. In addition, "fluid" is excreted by animals, and includes all liquids which may pass through particulate matters. Moreover, "fluid passing through" means that fluid passes through a certain point of the particulate matter and moves to the underside of the bottom portion. Moreover, "spreading" means that the particulate matters are spread and layered on the bottom portion of the upper container.

A second aspect of the animal litter box described in the first aspect of the present invention, in which the fitting portion is an stepped portion or a concave portion.

In the second aspect of the present invention, a stepped portion or a concave portion is exemplified as the fitting portion. With the abovementioned arrangement, the upper container may be easily detached from the lower container for cleaning or the like. Note that with the present invention, fitting includes an aspect that both containers simply make contact with each other in addition to a state in which both containers are fixed so as to prevent them from being easily detached during normal use.

A third aspect of the animal litter box described in the first or the second aspect, which is configured so that the upper container and the lower container are engaged detachably at an engaging portion while the upper container and the lower container are fitted, wherein the upper container and the lower container each includes an engaging piece for engagement.

According to the third aspect of the present invention, the structure of both containers being detachably engaged may prevent the upper container and the lower container from being easily detached except for cleaning. In addition, provision of the engaging portion at the aforementioned position further decreases deformation and increases comfort for animals since when animals are on top, the distance between the bottom of the upper container as the point to which force is applied and the engaging portion as a fulcrum which supports the force becomes even shorter than the case where only the fitting is used as a supporting point according to the first aspect.

A fourth aspect of the animal litter box described in the first through the third aspect, in which a cover for regulating the directions of entry and exit of animals is detachably attached to the upper container.

According to the fourth aspect of the present invention, it is possible to prevent the animals such as cats and the like from coming in and out from other places than the entrance formed at the cover. In addition, it is possible to prevent particulate matter from spreading to the outside when the particulate matter is kicked onto urine and feces with their legs after excretion. For example, a cover having a bottom part that is an approximately oblong rim frame, and an approximately U-shaped one in planar view around which side walls are provided at three sides of the rim frame and an opening for animals to come in and out is formed at one remaining side may be exemplified as the cover, but is not limited thereto. A roofed one is possible. In addition, it is preferable that the height of the side walls is 10 cm or more to prevent animals from jumping over and particulate matter from spreading to the outside when animals kick the particulate matter onto urine and feces with their legs after excretion. It is more preferably 10 cm to 40 cm. In addition, detachability makes cleaning easy.

According to the present invention, an animal litter box which allows suppression of costs for raw materials for molding, is compact and easy to store and carry when packaging, and comfortable for animals may be provided.

DETAILED DESCRIPTION OF THE INVENTION

Figure 1:
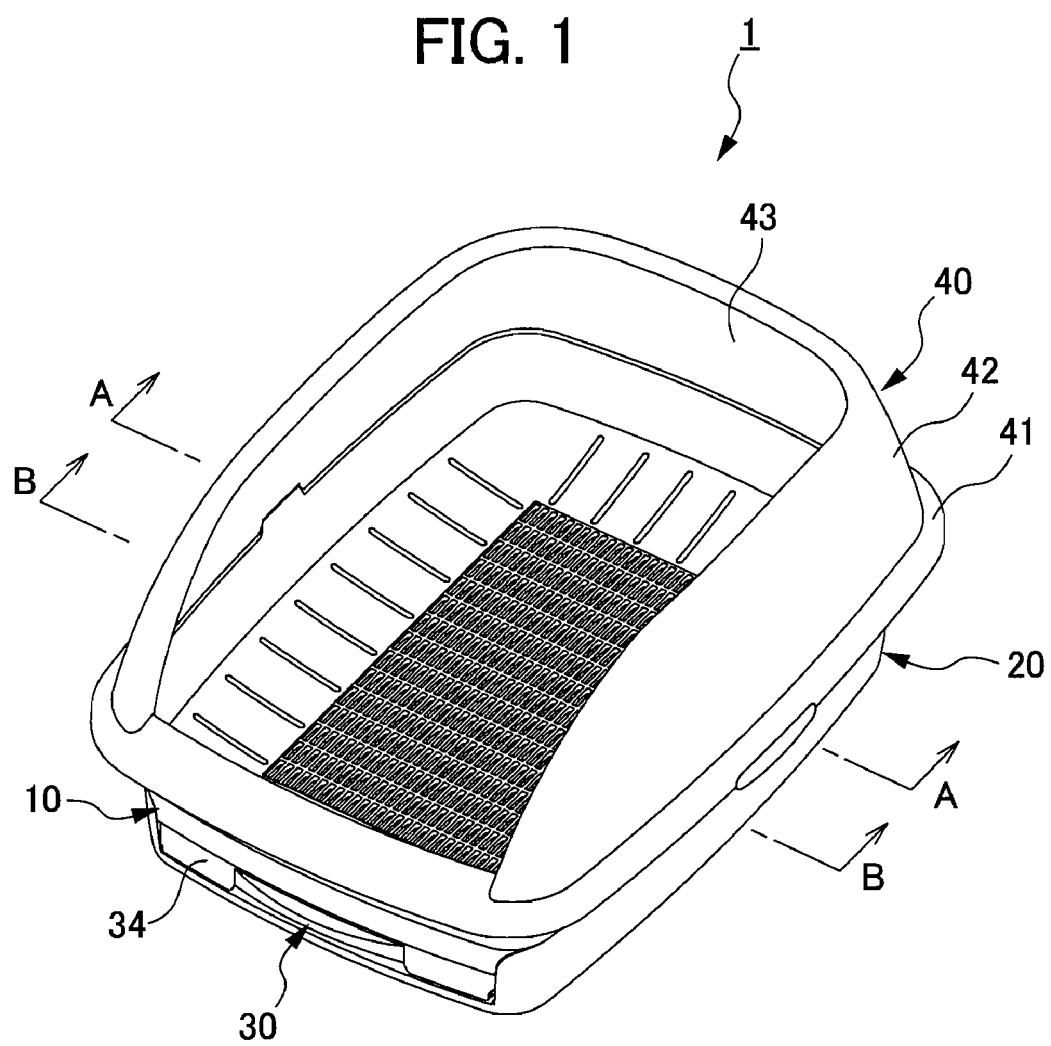
FIG. 1 is a perspective view of an animal litter box according to the present invention.

An embodiment of the present invention is described forthwith while referring to the drawings. Note that the present invention is not limited to the following embodiments, and may be modified appropriately and implemented within the scope of the present invention. In the following description, the same reference numerals are applied to the same elements, and overlapping descriptions may be omitted.

Figure 2:
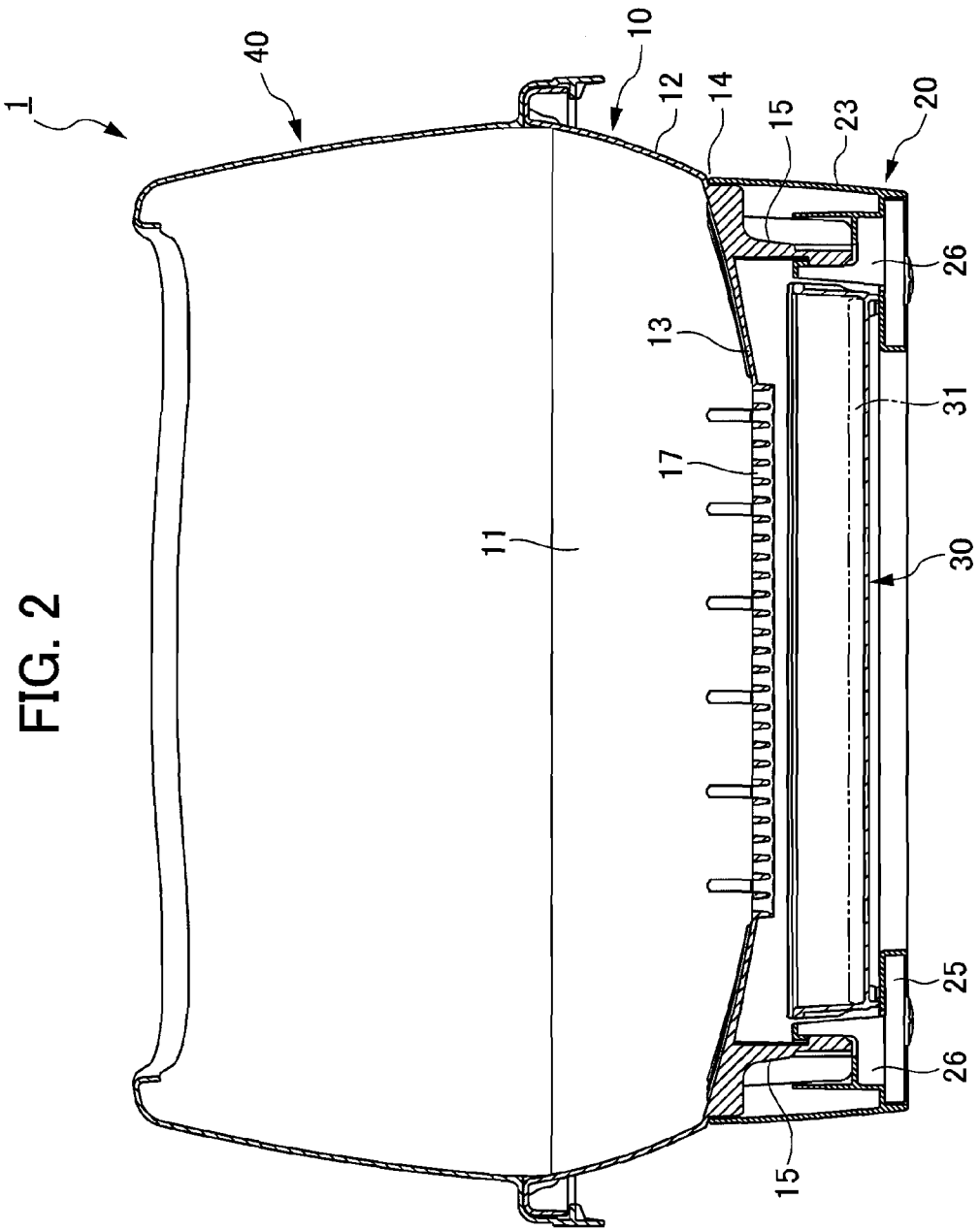
FIG. 2 is a cross section cut along the line A-A of FIG. 1.
Figure 6:
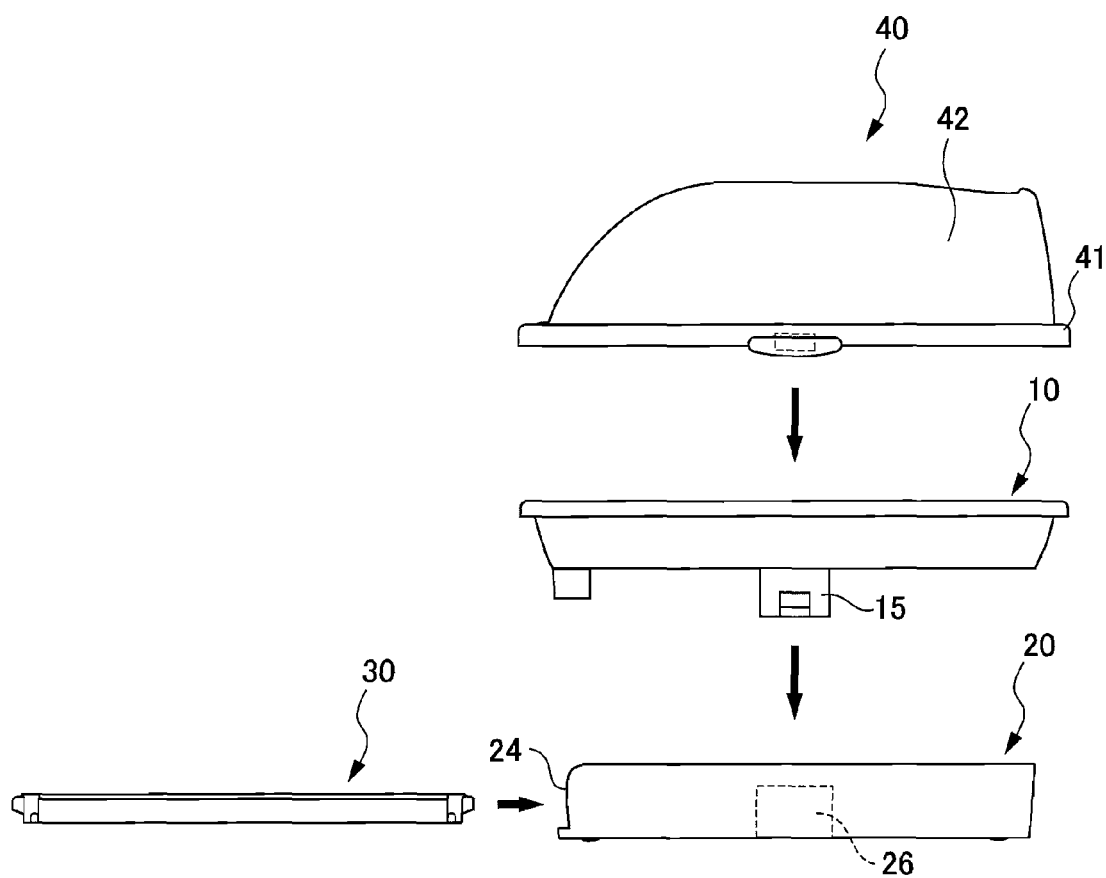
FIG. 6 is an exploded lateral view of the animal litter box according to the present invention.

FIG. 1 is an overall perspective view showing an animal litter box of an embodiment according to the present invention. FIG. 6 is an exploded lateral view of the animal litter box. As illustrated in FIG. 1 and FIG. 6, an animal litter box 1 according to the present invention is mainly configured with an upper container 10, a lower container 20 provided below the upper container 10 and supports the upper container 10, a fluid absorbing sheet placement container 30 held within the lower container 20, and a cover 40 provided on top of the upper container 10 so as to cover the sides thereof. FIG. 2 is a cross sectional view of the animal litter box shown in FIG. 1 cut along the line A-A. As illustrated in FIG. 2, a fluid absorbing sheet 31 is laid across the fluid absorbing sheet placement container 30.

Figure 3:
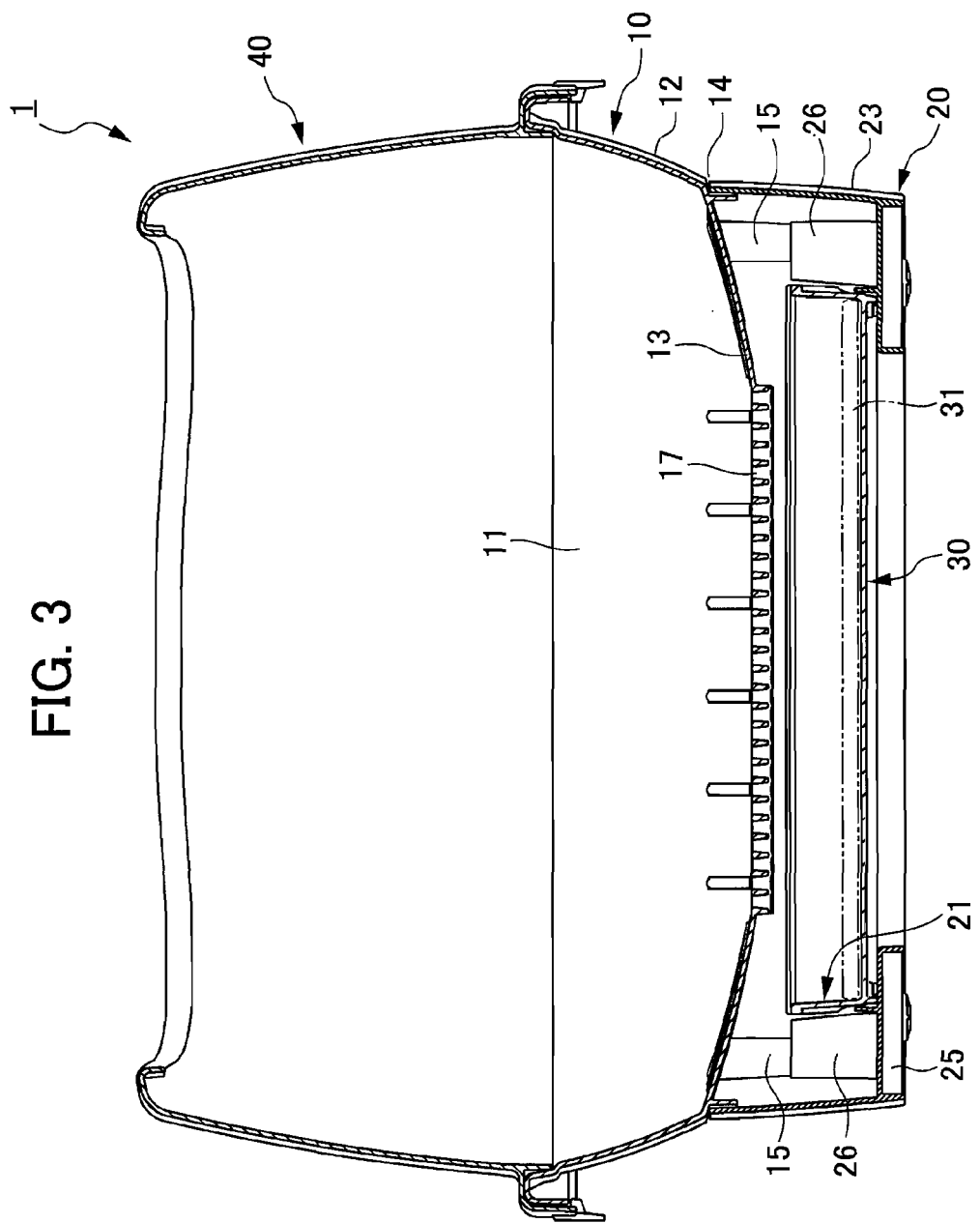
FIG. 3 is a cross section cut along the line B-B of FIG. 1.
Figure 4:
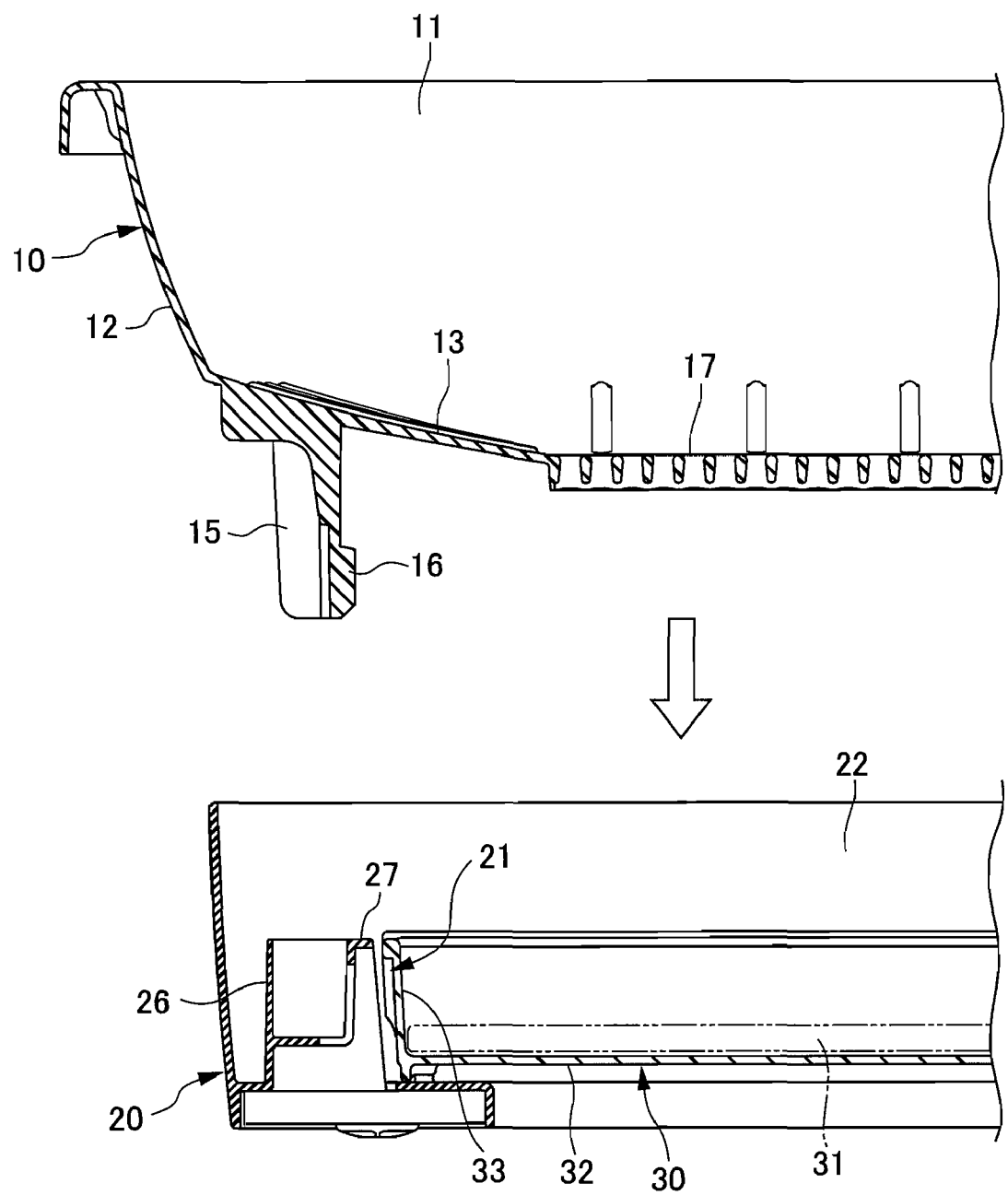
FIG. 4 is an exploded cross section cut along the line A-A of FIG. 1.

FIG. 3 is a cross sectional view of the animal litter box shown in FIG. 1 cut along the line B-B. FIG. 4 is an exploded cross sectional view of the cross section cut along the line A-A shown in FIG. 1. Referring to FIGS. 2 through 4, the upper container 10 includes an upper opening 11 for animals to come in and out, configured with four sides 12 and a bottom portion 13, and is made by molding a plastic material including polyolefin resin such as polyethylene (PE), polypropylene (PP), polyethylene terephthalate (PET) or the like, or a metal plate such as stainless steel or the like. Spreading particles across the bottom portion 13 within a concave portion of the upper container 10 allows use as an animal litter box.

As illustrated in FIG. 2 through FIG. 4, the bottom portion 13 includes fitting portion 14 which fits an edge of the opening on the top side of the lower container 20 in joining areas with the sides 12. The fitting portions 14 are arranged across three sides excluding the front side of the upper container 10. In addition, in the vicinity of approximately the center of both sides of the bottom portion 13, an engaging piece 15 is provided for engaging both containers at an engaging portion while the upper container and the lower container are fitted. The bottom portion 13 further includes multiple openings 17. Note that in this embodiment, the fitting portions are provided at joining areas between the bottom portion 13 and the sides 12, however, the position thereof is not particularly limited as long as it is provided at the sides or the bottom of the upper container.

As illustrated in FIG. 2 through FIG. 4, the fitting portions 14 of this embodiment are configured with a stepped portion. Note that the fitting portion 14 is not particularly limited as long as the bottom or the sides of the upper container 10 may be fitted to the edge of a lower opening of the lower container 20. The fitting portions may be concave portions as another aspect, for example.

As illustrated in FIG. 2 through FIG. 4, the engaging piece 15 includes an engaging protrusion 16 for engaging the upper container 10 and the lower container 20. Note that in this embodiment, the engaging piece 15 includes the engaging protrusion 16 to engage, but is not particularly limited as long as it may engage between the upper container 10 and the lower container 20. An engaging concave portion or the like may be included as another aspect, for example.

As illustrated in FIG. 1, the multiple openings 17 are molded and fabricated from a plastic material formed into a grating shape and integrated to the bottom portion 13. The multiple openings 17 include a continuous arch-shaped fluid leading portion on a side facing the fluid absorbing sheet 31. By providing the continuous arch-shaped fluid leading portion, urine excreted by an animal such as a cat or the like on particulate matters passes through the bottom portion, moves to the underside (side facing the fluid absorbing sheet) of the bottom portion, is effectively collected along the approximately arch-shaped fluid leading portion formed on the underside of the bottom portion, dripped onto the fluid absorbing sheet provided below and then absorbed therein.

As illustrated in FIG. 2, FIG. 4, and FIG. 6, the lower container 20 includes a holding portion 21 which holds a fluid absorbing sheet placement container 30, and is configured with a lower opening 22, three side walls 23, an opening side 24, and lower frames 25. In addition, as with the upper container 10, a plastic material including polyolefin resin such as polyethylene (PE), polypropylene (PP), polyethylene terephthalate (PET) or the like, or a metal plate such as stainless steel or the like is molded.

As illustrated in FIG. 1, FIG. 4, and FIG. 6, the holding portion 21 adopts a pull-out structure which can hold a drawer from the opening side 24. Note that the holding portion 21 is not particularly limited as long as it may hold the fluid absorbing sheet placement container 30, and allow the fluid absorbing sheet 31 within the fluid absorbing sheet placement container to absorb the fluid passing through the multiple openings 17 provided at the bottom portion 13 of the upper container 10.

As illustrated in FIG. 2 and FIG. 4, each of the lower frames 25 includes a second engaging piece 26. In addition, the second engaging piece 26 includes a second engaging protrusion 27 for engaging the upper container and the lower container. The upper container and the lower container engage with each other when the second engaging protrusion 27 climbs over the engaging protrusion 16 provided at the upper container (refer to FIG. 2 and FIG. 4). If an animal gets on the litter box, deformation of the bottom portion 13 of the upper container 10 may decrease since the distance between the proximity of the center of the multiple openings 17 provided at the upper container 10 as the point to which force is applied and the engaging portion as a fulcrum which supports the force is short. In addition, fixing the upper container 10 and the lower container 20 securely allows prevention of detachment of the upper container 10 from the lower container 20 except for cleaning.

As illustrated in FIG. 1 and FIG. 4, the fluid absorbing sheet placement container 30 is a drawer-shaped box which is configured with a bottom plate 32 on which the fluid absorbing sheet 31 is laid, three-sided side plates 33 provided at the periphery of the bottom plate 32, and a front plate 34. As with the upper container 10, a plastic material including polyolefin resin such as polyethylene (PE), polypropylene (PP), polyethylene terephthalate (PET) or the like, or a metal plate such as stainless steel or the like is molded. In addition, the fluid absorbing sheet placement container 30 is provided below the upper container 10, and is a drawer freely pushed in and pulled out from the opening side 24, which is provided at the lower container 20.

As illustrated in FIG. 1 and FIG. 6, the cover 40 having a bottom portion that is an approximately oblong rim frame 41, and an approximately U-shaped box in planar view around which wall elements 42 are provided at three sides of the rim frame 41 and an opening 43 for animals to come in and out is formed at the remaining side, and is made by molding a plastic material including polyolefin resin such as polyethylene (PE), polypropylene (PP), polyethylene terephthalate (PET) or the like, or a metal plate such as stainless steel or the like. The rim frame 41 has almost the same size as the top edge of the upper container 10, and is formed into a shape which may be fitted to the top edge of the upper container 10. The height of the walls 42 is at least 10 cm or greater, preferably from 10 cm to 40 cm, to prevent spreading particulate matter to the outside when an animal kicks the particulate matter onto urine and feces with their legs after excretion, and to prevent animals from coming in and out through other places than the entrance. Note that in this embodiment, a structure in which the cover 40 is fitted and provided on the top of the upper container 10 is employed but not limited thereto. The structure in which the cover 40 is not provided is also possible.

Figure 5:
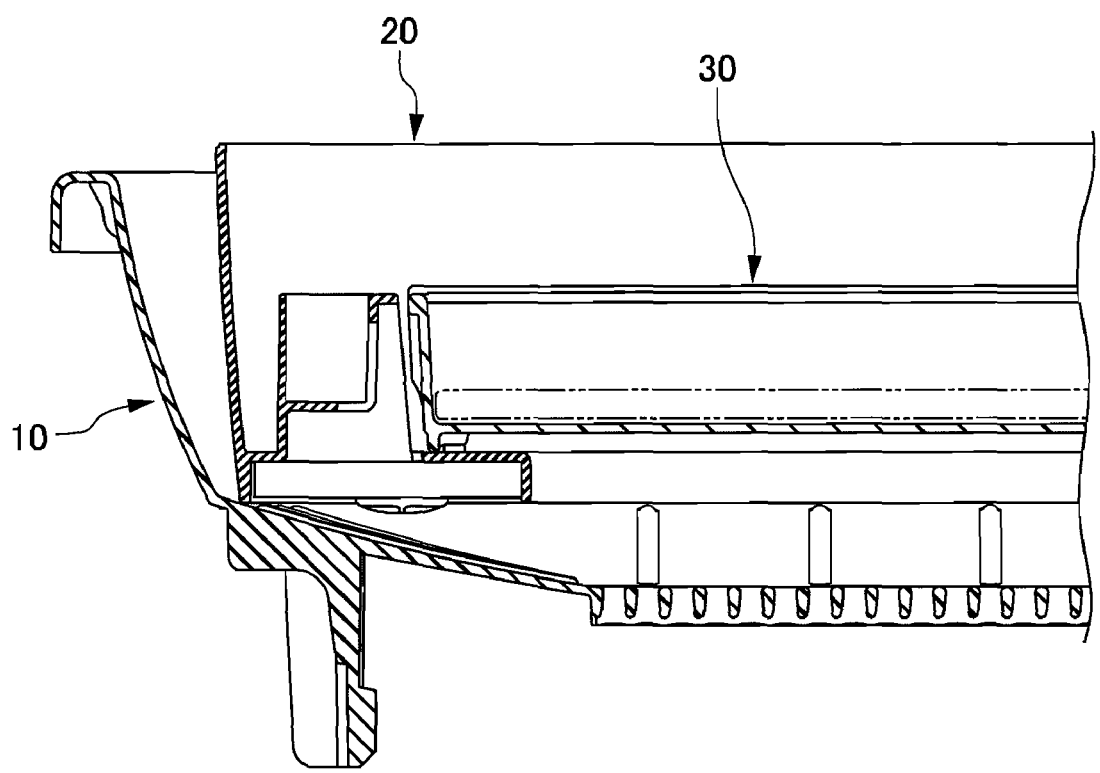
FIG. 5 is a schematic diagram showing a held state of an upper container and a lower container during distribution and packaging.

The animal litter box of the present invention exhibits its excellent effectiveness not only during use but also during carriage and storage. FIG. 5 is a schematic diagram showing a held state of an upper container and a lower container during distribution and packaging. In other words, as illustrated in FIG. 5, the lower container 20 may be held within the concave portion of the upper container 10 when the upper container 10 and the lower container 20 are separated by detaching the engaging portion. This allows a reduction in volume in a held state, allowing suppression of costs for carriage and storage.

What is claimed is:

1. An animal litter box, comprising:
  an upper container comprising an upper opening for animals to come in and out, and a bottom portion which allows fluid to pass through and over which particulate matter is spread; and
  a lower container, separable from the upper container at both sides thereof, the lower container having outer side walls, an opening at the top side provided below the bottom portion, and a holding portion for disposing a fluid absorbing sheet which absorbs fluid passing through the bottom portion, wherein
  a fitting portion for fitting to an edge of a lower opening of the lower container, provided at the side or bottom of the upper container,
  wherein the fitting portion includes an upper engaging portion having a protrusion portion thereon and extending from the side of the upper container toward an inner side of the lower container, without intervening in the holding portion, and
  wherein the lower container includes a lower engaging portion that is spaced inwardly from the outer sidewalls of the lower container and engages with the upper engaging portion, and
  the lower engaging portion has a second protrusion portion that slides over the protrusion portion on the upper engaging portion, and engages with the upper engaging portion,
  wherein the engaging portion and the lower engaging portion are configured with elastically deformable material,
  the upper engaging portion is not in direct contact with the outer side walls of the lower container, and
  the second protrusion portion of the lower engaging portion and the protrusion portion of the upper engaging portion are aligned and configured so that when the upper container and the lower container are brought together to be coupled to one another the second protrusion portion of the lower engaging portion contacts the protrusion portion of the upper engaging portion and at least one of the upper engaging portion and the lower engaging portion is deformed so that the second protrusion portion of the lower engaging portion slides over the protrusion portion of the upper engaging portion, whereby at least one of the upper engaging portion and the lower engaging portion deforms upon initial contact between the upper and lower containers and recovers from the deformation upon full contact between the upper and lower containers.

2. The animal litter box according to claim 1, wherein the fitting portion is a stepped portion or a concave portion.

3. The animal litter box according to claim 1, wherein the upper container and the lower container are engaged detachably at an engaging portion while the upper container and the lower container are coupled together.

4. The animal litter box according to claim 1, wherein a cover for regulating directions of entry and exit of animals is detachably attached to the upper container.

5. The animal litter box according to claim 1, wherein the lower engaging portion extends from a side of the lower container toward an inner side thereof, and the second protrusion portion is provided at an innermost side of the lower engaging portion.

6. The animal litter box according to claim 1, wherein the protrusion of the upper engaging portion does not support the upper container on the lower container when the upper container is fitted on the lower container.

* * * * *